No. 727,461. PATENTED MAY 5, 1903.
A. M. SCHREUDER.
WATER COOLING TOWER.
APPLICATION FILED DEC. 17, 1901.
NO MODEL. 2 SHEETS—SHEET 2.
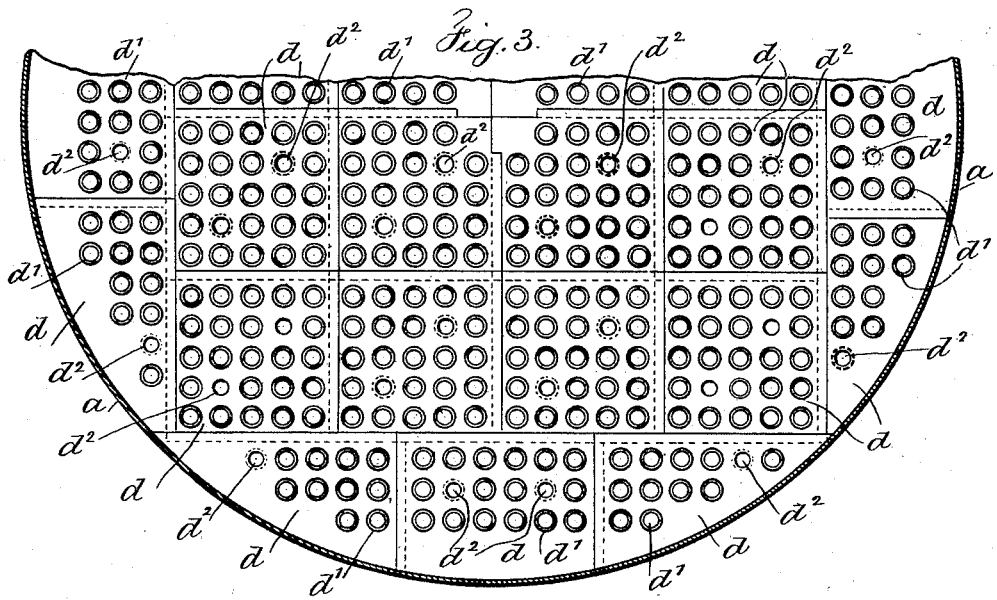
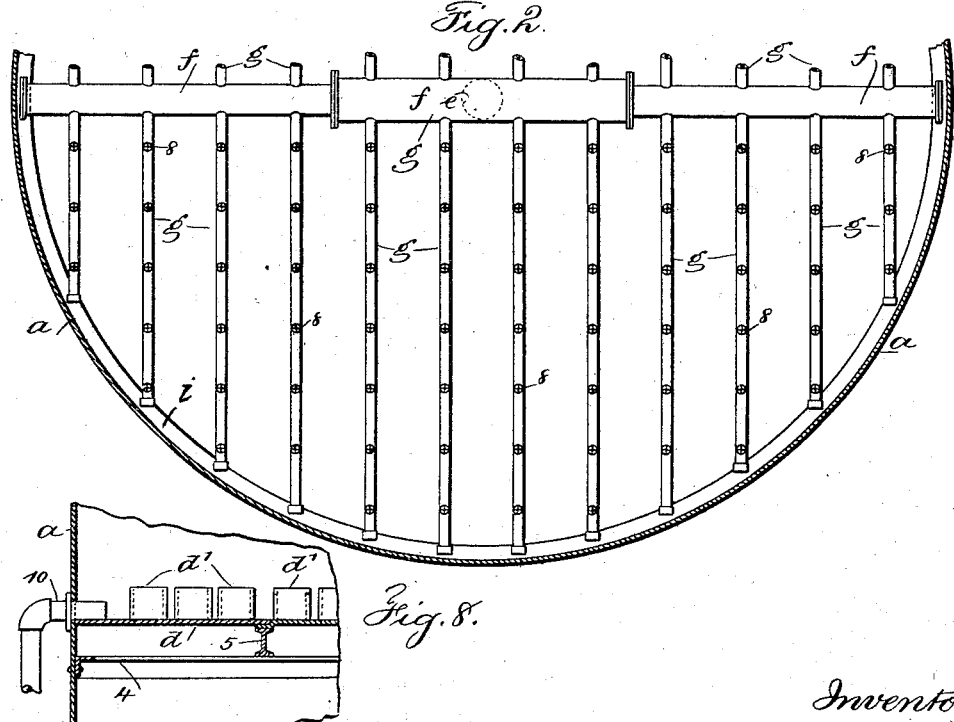
Witnesses
Chas H. Smith
J. Staib
Inventor
Andrew M. Schreuder
per L. W. Serrell & Son
Atty No. 727,461. Patented May 5, 1903.

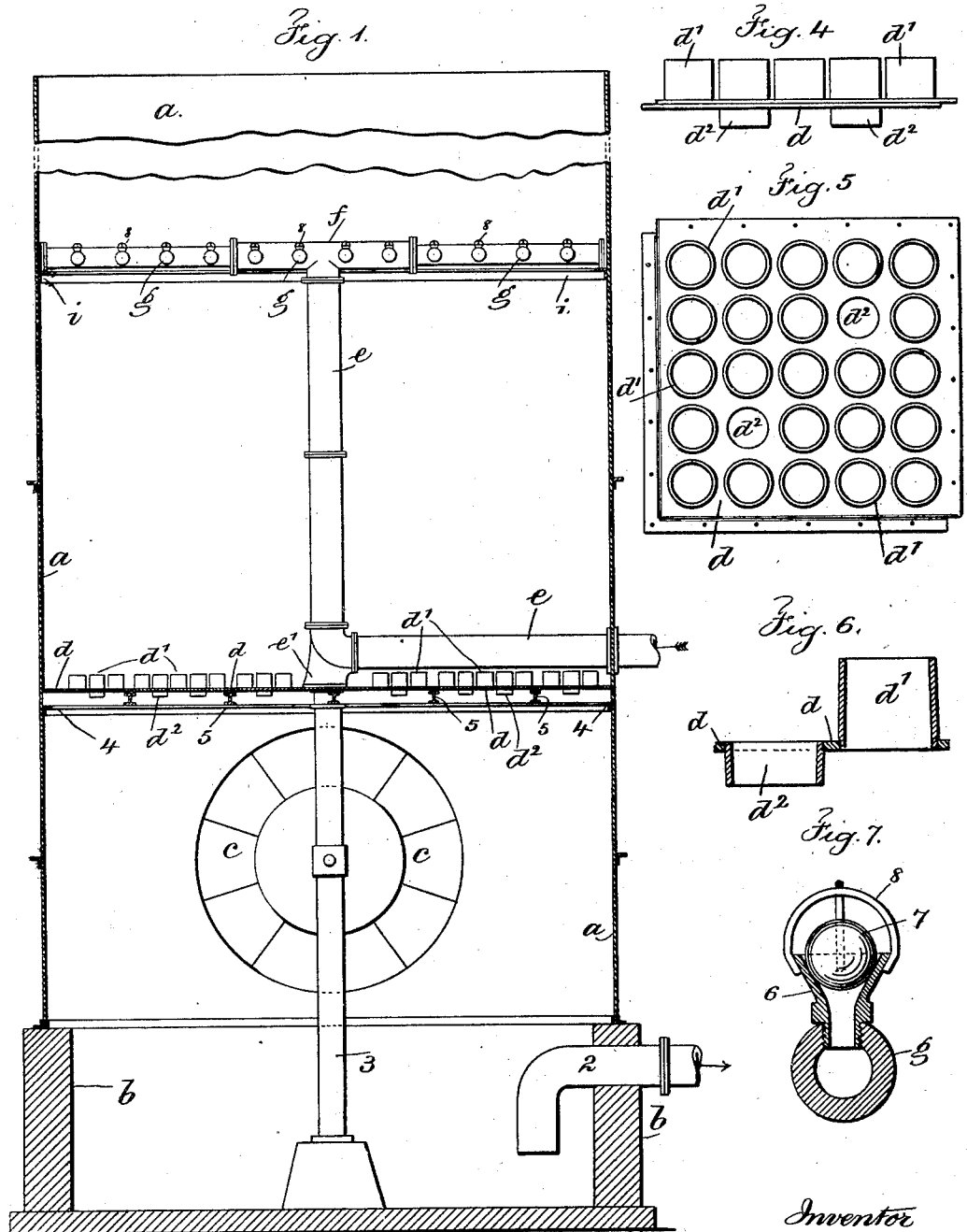

UNITED STATES PATENT OFFICE.

ANDREW M. SCHREUDER, OF GERMANTOWN, PENNSYLVANIA, ASSIGNOR TO HIMSELF, AND FREDERICK D. HERBERT, OF NEW YORK, N. Y.

WATER-COOLING TOWER.

SPECIFICATION forming part of Letters Patent No. 727,461, dated May 5, 1903.

Application filed December 17, 1901. Serial No. 86,219. (No model.)

*To all whom it may concern:*

Be it known that I, ANDREW M. SCHREUDER, a citizen of the United States, residing at Germantown, Philadelphia, in the county of Philadelphia and State of Pennsylvania, have invented an Improvement in Water-Cooling Towers, of which the following is a specification.

In cooling-towers as heretofore constructed it has been usual to employ vertically-placed mats and to discharge water to be cooled from pipes above the mats, so that as the water trickled down the mats ascending currents of air cooled the same, the water falling into a reservoir from which it was conveyed away. In this art towers have also been employed where the water in a comminuted state descended through the tower and was cooled by the rising currents of air. In these towers both natural draft and forced draft by a fan device have been employed.

My invention has special reference to forced-draft cooling-towers employing fan devices.

In carrying out my invention the tower is provided with a series of plates placed horizontally and dividing the tower in its vertical height into two or more portions. These plates form a septum or diaphragm across the tower, and they are provided with series of perforations, and to these perforations are connected series of short open-ended tubes extending upwardly, and I prefer to employ other short open-ended tubes extending downwardly. There are numerous short open-ended tubes extending upwardly, but only comparatively few extending downwardly. The circulating water is conveyed through a discharge-pipe into the tower and upward to an appreciable distance above said series of plates, and at the upper end of said discharge-pipe I provide a transverse main and series of radiating-pipes carrying spraying-nozzles, from which the water is delivered in comminuted or spray form and falls down through the tower. The fan device is located below said series of plates, and the air under pressure or force rises through the tower and through the upwardly-extending tubes and coming in contact with the falling water cools the same. The water falls upon the series of plates, and its downward movement is arrested. It collects on said plates and its further downward movement is preferably through the downwardly-extending tubes, so that while the water to be cooled is delivered from the spraying-nozzles in a comminuted condition its descent below said series of plates is more in the form of solid streams. The water may be taken away above the plates by a suction-pipe entering the tower at this place.

Heretofore in this art and where water in a comminuted condition passed downward through the tower and into proximity with the fan device a portion of the water was liable to pass out through the fan and also to strike the fan and to be spattered and thrown around. To overcome this disadvantage and obviate the difficulty of the wasting of circulating water necessarily accompanying the same, the descending water in a comminuted state is arrested before it reaches the fan device, or that part of the lower portion of the tower where the air is admitted, by a septum on which and around the upwardly-extending open-ended tubes in the same the water collects and passes in practically solid streams through the downwardly-extending open-ended tubes and through that part of the tower where the air is admitted. As descending water in solid streams cannot be blown about and lost as readily as when the water is in the comminuted condition, it will be apparent that in my improved tower I combine the advantages of delivering the water in comminuted condition and passing the same in a solid state through that portion of the tower in which air is admitted.

In the drawings, Figure 1 is a vertical section and partial elevation representing my improvement. Fig. 2 is a partial plan above the plane of the series of pipes and their spraying-nozzles. Fig. 3 is a partial plan above the series of plates and the short open-ended tubes. Fig. 4 is an elevation, and Fig. 5 a plan, representing one of the series of plates. Fig. 6 is a cross-section through a portion of one of such plates and through an upward open-ended-tube extension and also a downward open-ended-tube extension, and Fig. 7 is a cross-section and partial elevation of one of the series of pipes and spraying-nozzles. Fig. 8 is a cross-section showing a modification. Figs. 2, 3, 4, 5, 6, 7, and 8 are shown of larger size than Fig. 1 for clearness.

$a$ represents the shell of the tower, which may be of circular or rectangular form; $b$, the foundation of brick or other masonry, which at the same time forms a reservoir at the base of the tower for the cooled water, and 2 is a suction-pipe from said foundation-reservoir.

$c$ represents the fan device, of any desired or well-known construction. I prefer to provide a central support or column 3, suitably supported at the foundation, and I provide an annular L-shaped flange 4 within and secured to the shell of the tower and constituting a ledge or bracket, upon which rest I-beams 5, located transversely of the tower.

$d$ represents series of rectangular and angular plates horizontally placed and at their edges advantageously overlapping and riveted together. These form a diaphragm or septum across the tower, dividing the same into lower and upper portions, and they extend continuously across within the tower and rest upon the I-beams 5, which beams are advantageously placed under the overlapped edges of said plates. I have shown in Figs. 4 and 5 one of said plates, from which it will be noticed that two of the edges of the plate are offset to an extent substantially equal to the thickness of the metal of the plates, so that the edges of the adjacent plates overlap, and the plates are riveted together, and when so riveted the upper surfaces of all the plates are approximately in the same horizontal plane. These plates are provided with series of parallel perforations interiorly threaded. $d'$ and $d^2$ represent short open-ended tubes, the tubes $d'$ being preferably longer than the tubes $d^2$. One end of each tube is exteriorly threaded, and said threaded ends are adapted to screw into the threaded perforations of the said series of plates, the tubes $d'$ rising or extending upward from the horizontal plane of said series of plates and the tubes $d^2$ extending downward therefrom. From Figs. 3, 4, and 5 it will be noticed that the tubes $d'$ greatly outnumber the tubes $d^2$. In fact, in Fig. 5 it will be noticed that there are twenty-three tubes extending upward and only two tubes extending downward in one plate, and this proportion extends generally throughout all the plates.

$e$ represents a discharge-pipe for circulating water carried into the tower and upward in the central portion to approximately a point in the full-sized tower about fifteen or twenty feet above the series of plates $d$. At the upper end of the pipe $e$ I provide a transverse main pipe $f$, and from opposite sides of the pipe $f$ extend series of distribution-pipes $g$, preferably parallel to one another and extending from the said main to the shell of the tower.

I prefer to employ an annular L-shaped flange $i$ around within the tower immediately beneath the transverse main $f$ and the series of pipes $g$ and similar in character to the flange 4, and the same receives and assists in supporting the said series of pipes and the said main, additional support, however, being derived from the central support 3, which comes up to the under surface of the series of plates $d$ or one of the I-beams 5, and a foot-piece $e'$, formed on the bend of the discharge-pipe $e$ directly above and in line with the said central support 3.

The series of pipes $g$ are provided with spraying-nozzles, each advantageously comprising a flaring pipe-section 6, screwed into an opening in the said pipes $g$, a ball 7, and cage 8, and these spraying-nozzles rise and extend upwardly from the series of pipes $g$.

In the operation of the device the circulating water to be cooled enters the tower and rises through the discharge-pipe $e$, passes into the transverse main $f$ and series of pipes $g$, and escapes through the spraying-nozzles $g$, and as there is some force in this water the same is usually delivered from the spraying-nozzles in a comminuted condition and falls between the pipes $g$ and down through the tower and is arrested by the series of plates $d$. The fan device forces air into the lower part of the tower, and the same rises through the short open-ended tubes $d'$ in the series of plates and passing up through the tower comes in contact with the circulating water and cools the same, and the circulating water falling is arrested by the series of plates $d$, collects thereon, and passes down through the short open-ended tubes $d^2$ more or less in the form of solid streams of water substantially unaffected in their descent by the action of the air being forced into the tower by the fan device. This cooled water collects in the foundation-reservoir and is removed therefrom by the suction-pipe 2. The upwardly-extending tubes employed as air-passages are numerically greatly in excess of the number of downwardly-extending tubes employed to convey the water collected upon the plates, and the water collects upon the plates because their receiving area is so large in proportion to the discharge area of the downwardly-extending tube-sections.

In Fig. 1 I have shown the top of the tower as divided from the lower portion, because the upper portion of the tower above the series of pipes $g$ may be carried up to any desired extent, approximately twenty feet or more above the spraying-nozzles, not only to provide for the collection of as much as possible of the circulating water and any steam arising therefrom, but to insure the proper draft.

All the joints between the edges of the series of rectangular and angular plates, as well as between the same and the tower, may be made in any manner well known in the art for causing the same to be water-tight and hold the water above said plates, so that its escape will only be as provided.

In Fig. 8 I have shown a modification of my invention, and in this form I may dispense with the reservoir in the foundation and the downwardly-extending short open-ended tubes $d^2$ and provide a pipe 10, passing through the tower above the level of the series of plates as a suction-pipe for the water collecting upon said plates.

The number of the upwardly-extending open-ended tubes is as great as possible in order to reduce the obstruction to the rising currents to a minimum. Moreover, these upwardly-extending tubes produce a number of independent air-currents immediately above the septum, and these tend to keep the water in suspension above the septum and within the shell of the tower for a much longer period than would otherwise be the case, so as to effectually reduce the temperature of the water.

I claim as my invention—

1. In a water-cooling tower, the combination with an inclosing shell and a foundation therefor forming a reservoir, of a septum horizontally disposed within the tower and having a series of perforations therein, short open-ended tubes extending upwardly and other short open-ended tubes extending downwardly from selected perforations in said septum, the upwardly-extending tubes preponderating in number, a discharge-pipe for circulating water passing into the tower and rising to an appreciable height, means connected with the said discharge-pipe for distributing circulating water, and means connected with the aforesaid means for delivering the circulating water in a comminuted condition, substantially as and for the purposes set forth.

2. In a water-cooling tower, the combination with an inclosing shell, a foundation therefor forming a reservoir, and a fan device for forcing air into the tower, of a septum horizontally disposed within the tower above the said fan device and having series of perforations therein, short open-ended tubes extending upwardly and other short open-ended tubes extending downwardly from selected perforations in said septum, the upwardly-extending tubes preponderating in number, a discharge-pipe for circulating water passing into the tower and rising to an appreciable height, means connected with the said discharge-pipe for distributing the circulating water, and means connected with the aforesaid means for delivering the circulating water in a comminuted condition, substantially as and for the purposes set forth.

3. In a water-cooling tower, the combination with an inclosing shell and a foundation therefor forming a reservoir, of a septum horizontally disposed within the tower and having a series of perforations therein, short open-ended tubes extending upwardly and other short open-ended tubes extending downwardly from selected perforations in said septum, the upwardly-extending tubes preponderating in number, a discharge-pipe for circulating water passing into the tower and rising to an appreciable height, a main pipe and a series of distribution-pipes therefrom connected to said discharge-pipe and occupying a horizontal plane above said septum, and spraying-nozzles connected to the said series of distribution-pipes for delivering the circulating water in a comminuted condition, substantially as and for the purposes set forth.

4. In a water-cooling tower, the combination with an inclosing shell, a foundation therefor forming a reservoir, and a fan device for forcing air into the tower, of a septum horizontally disposed within the tower above the said fan device and having a series of perforations therein, short open-ended tubes extending upwardly and other short open-ended tubes extending downwardly from selected perforations in said septum, the upwardly-extending tubes preponderating in number, a discharge-pipe for circulating water passing into the tower and rising to an appreciable height, a main pipe and a series of distribution-pipes therefrom connected to said discharge-pipe and occupying a horizontal plane above the said septum, and spraying-nozzles connected to the said series of distribution-pipes for delivering the circulating water in a comminuted condition, substantially as and for the purposes set forth.

5. In a water-cooling tower, the combination with a discharge-pipe and the pipes and spraying-nozzles connected therewith, of a series of rectangular and angular plates disposed in a horizontal plane across within the tower and appreciably below the spraying-nozzle devices, each plate having one or more offset edges overlapping the flat edges of the adjacent plates, means for securely connecting the plates together to form a diaphragm or septum in the tower and said plates having series of perforations interiorly threaded, short open-ended tubes extending upwardly and secured to said plates at the threaded perforations, and short open-ended tubes extending downwardly and secured to said threaded perforations, the upwardly-extending tubes being numerically greatly in excess of the number of downwardly-extending tubes, and the downwardly-extending tubes being interspersed among the upwardly-extending tubes, substantially as set forth.

6. In a water-cooling tower, the combination with a discharge-pipe and the pipes and spraying-nozzles connected therewith, of a series of rectangular and angular plates disposed in a horizontal plane across within the tower and appreciably below the spraying-nozzle devices, each plate having one or more offset edges overlapping the flat edges of the adjacent plates, means for securely connecting the plates together to form a diaphragm or septum in the tower, and said plates having series of perforations interiorly threaded, short open-ended tubes extending upwardly and secured to said plates at selected perforations, short open-ended tubes extending downwardly and secured to selected perforations, the upwardly-extending tubes being numerically greatly in excess of the number of downwardly-extending tubes, and the downwardly-extending tubes being interspersed among the upwardly-extending tubes, an annular L-shaped flange secured around within the shell of the tower, and I-beams extending transversely of the tower and resting on said flange, said beams forming a support for the aforesaid series of plates, substantially as set forth.

7. In a water-cooling tower, the combination with an inclosing shell and a foundation therefor forming a reservoir, and a fan device for forcing air into the tower, of a series of plates disposed in a horizontal plane across within the tower above the fan device and having series of perforations therein, short open-ended tubes extending upwardly, and other short open-ended tubes extending downwardly from selected perforations of said plates, the upwardly-extending tubes preponderating in number, a discharge-pipe for circulating water passing into the tower above said series of plates and rising to an appreciable height, a main pipe and a series of distribution-pipes therefrom connected to said discharge-pipe and occupying a horizontal plane above the said series of plates, and spraying-nozzles connected to said series of pipes for delivering the circulating water in a comminuted condition, substantially as and for the purposes set forth.

8. In a water-cooling tower, the combination with an inclosing shell and a foundation therefor forming a reservoir, and a fan device for forcing air into the tower, of a series of plates disposed in a horizontal plane across within the tower above the fan device and having series of perforations therein, short open-ended tubes extending upwardly and other short open-ended tubes extending downwardly from selected perforations of said plates, the upwardly-extending tubes preponderating in number, a discharge-pipe for circulating water passing into the tower above said series of plates and rising to an appreciable height, a main pipe and a series of distribution-pipes therefrom connected to said discharge-pipe and occupying a horizontal plane above the said series of plates, spraying-nozzles connected to said series of pipes for delivering the circulating water in a comminuted condition, an annular L-shaped flange secured within the shell of the tower and below and forming a support for the series of pipes, another annular L-shaped flange within the tower below the series of plates and the open-ended tubes connected therewith, and I-beams resting upon the latter flange and coming between the same and the series of plates as supports therefor, substantially as set forth.

Signed by me this 30th day of November, 1901.

ANDREW M. SCHREUDER.

Witnesses:
ARTHUR E. MORRISON,
A. O. NILE.